United States Patent [19]

Maynard

[11] Patent Number: 4,769,890

[45] Date of Patent: Sep. 13, 1988

[54] HUB AND BEARING PULLER AND PRESS DRIVE

[76] Inventor: Wade Maynard, 4281 Wakonda Dr., Norwalk, Iowa 50211

[21] Appl. No.: 34

[22] Filed: Jan. 2, 1987

[51] Int. Cl.$^{4}$ .............................................. B23P 19/04

[52] U.S. Cl. ......................................... 29/259; 29/266

[58] Field of Search ................. 29/256, 258, 260, 263, 29/264, 265, 259, 266

[56] References Cited

U.S. PATENT DOCUMENTS

| | | | |
|---|---|---|---|
| 3,200,484 | 8/1965 | Garnam | 29/263 |
| 4,057,889 | 11/1977 | Ferguson | 29/266 |
| 4,283,827 | 8/1981 | Abel | 29/263 |
| 4,562,631 | 1/1986 | Welch | 29/259 |
| 4,570,319 | 2/1986 | Skoworodko | 29/259 |
| 4,642,866 | 2/1987 | Murtaugh | 29/266 |

*Primary Examiner*—Robert C. Watson

*Attorney, Agent, or Firm*—Jerome Goldberg

[57] ABSTRACT

A device for removing a hub and a bearing from a spindle of an automotive wheel drive, and also for pressing a bearing and a hub back into the spindle. The device includes a screw drive which is rotatable but does not move longitudinally when pulling the hub out from the bearing or pushing the bearing out from the spindle. A housing is secured to the hub and threadedly attached to the screw drive. The housing moves inward along the screw drive for pulling the hub out from the bearing, as the screw drive is rotated. A nut is threadedly attached to the screw drive and moves inward along the screw drive for pushing the bearing out from the spindle, as the screw drive is rotated. The rotatable screw drive is also utilized to move longitudinally toward the spindle for pressing the bearing back into the spindle and pressing the hub back into the bearing.

4 Claims, 2 Drawing Sheets

FIG.5
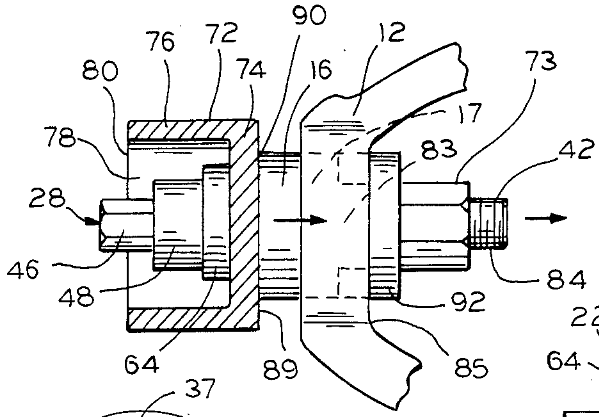
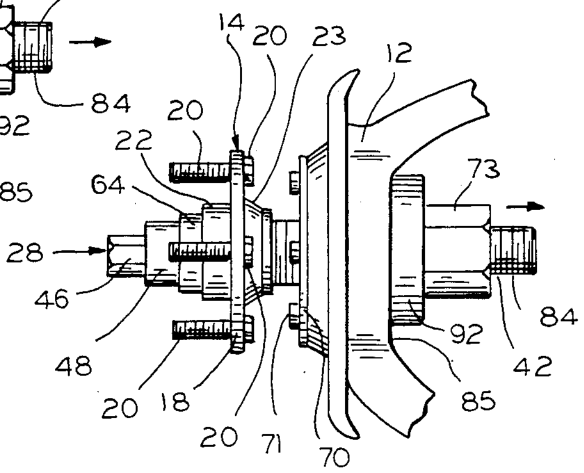
FIG.6
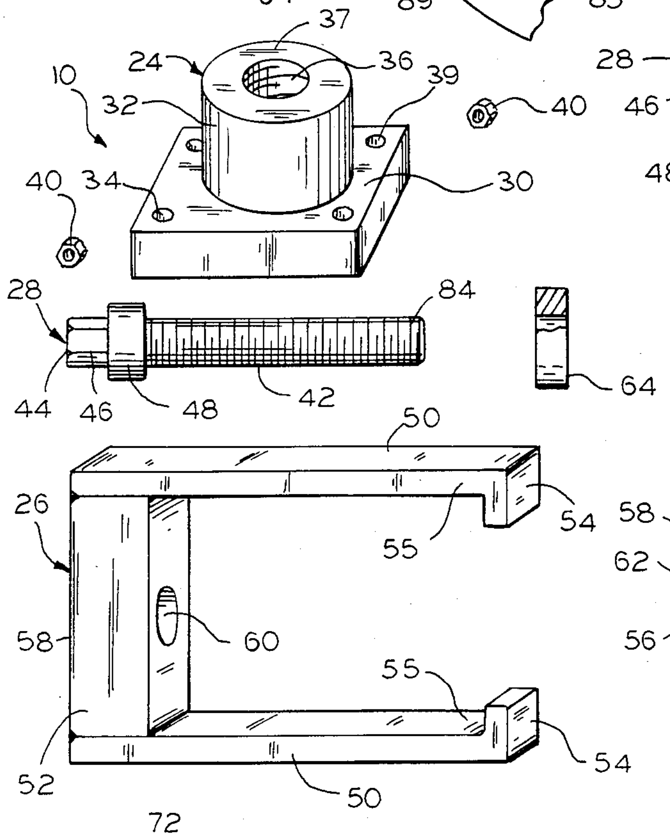
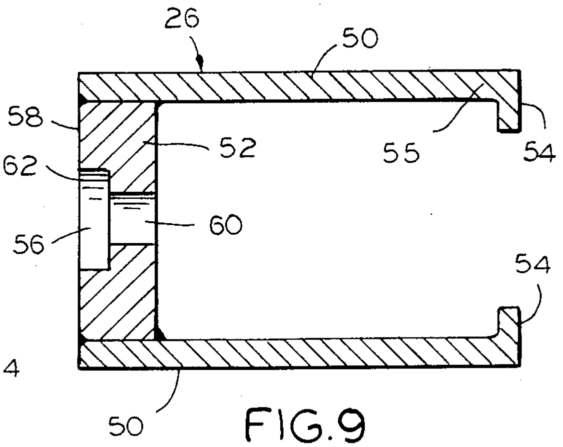
FIG.9
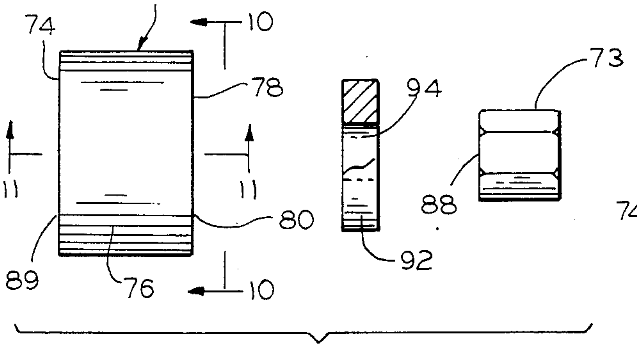
FIG.7
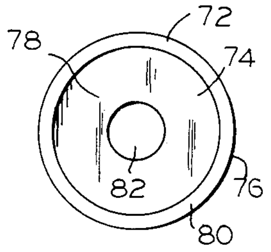
FIG.10
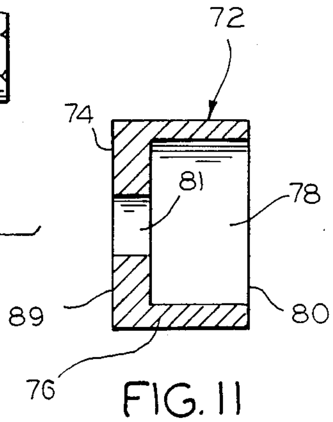
FIG.11

HUB AND BEARING PULLER AND PRESS DRIVE

BACKGROUND OF THE INVENTION

This invention relates generally to a device for removing a hub and a bearing assembly from a spindle and for pressing the bearing assembly and hub back into the spindle.

In my U.S. Pat. No. 3,887,989 (1975) entitled Bearing Puller Device, a screw drive is used which moves longitudinally for applying an even vertical force against a shaft for freeing the bearing assembly from its seat on the shaft or for pressing the bearing assembly back on the shaft.

In my present invention, a screw drive is also utilized which is rotatable but does not move longitudinally when freeing the hub and bearing assembly from the spindle. The rotational force from the screw drive is transferred to a threadedly associated member which is caused to move longitudinally along the screw for pulling the hub out from the bearing assembly or pushing the bearing assembly out from the spindle.

In many of the prior pulling and press devices there was the danger that the bearing assembly would shatter upon being released from the spindle and cause injury to the service mechanic or to a bystander. The present invention prevents this occurrence by applying an incremental and evenly distributed pressure against the bearing assembly to free the bearing assembly from its press fit association with the spindle. Moreover as a further protection, the bearing and also the hub is caused to fall into an enclosure, after the bearing or hub is released from the spindle.

SUMMARY OF THE INVENTION

The hub and bearing puller and press device of this invention comprises a screw drive which is rotatable but does not move longitudinally when pulling the hub out from the bearing and the bearing out from the spindle. A housing is secured to the hub and threadedly attached to the screw drive. As the screw drive is rotated, the housing moves along the screw drive and pulls the hub out from the bearing and into the cavity of the housing. After the hub is removed, a nut is threadedly attached to the outer end of the screw drive. As the screw drive is rotated, the nut moves along the screw drive and pushes the bearing out from the spindle.

The screw drive is secured to the spindle but is rotatable and moves longitudinally, when the bearing is pressed back into the spindle or the hub is forced into the bearing. A flat member is positioned on the screw drive and abuts the hub or bearing. The flat member moves with the longitudinal movement of the screw drive, and forces the bearing into the spindle or the hub into the bearing.

A brace means is provided for supporting the screw drive and contacts the spindle when removing the hub from the bearing or the bearing from the spindle. The brace means cooperates with the screw drive to prevent the longitudinal movement of the screw drive. The brace means may be a hollow cylindrical member to receive and enclose the bearing after it is freed from the spindle.

The pulling or pushing operations for removing the hub or bearing from the spindle or pressing the hub or bearing back into the spindle, are accomplished by the positive and incremental movement of the screw drive. In this manner, the pulling or pressing forces are evenly distributed on the hub or the bearing acted upon. This prevents shattering or damage of the parts, and ensures proper and safe installation and removal of the parts.

Accordingly, it is a primary object of this invention to provide a device for easily removing an axle hub from a wheel bearing and then removing the wheel bearing from the spindle.

Another primary object is to provide safe guards in the event of any shattering of the parts upon removal from the spindle. A related object is provide a device having enclosures for receiving the hub or the bearing, after removal from the spindle.

Another object is to provide a device for incrementally applying force to the hub and bearing when removing or inserting the hub and bearing into the spindle.

Another object is to provide a screw drive which is rotatable but does not move longitudinally when removing the hub or bearing from the spindle.

Still another object to provide a screw drive which is rotatable and moves longitudinally when forcing the hub or bearing into the spindle.

A feature of the invention is to provide a brace member for supporting the screw drive and contacting the spindle, and cooperating with the screw drive to permit rotational movement and preventing longitudinal movement of the screw drive when removing the hub or bearing from the spindle.

BRIEF DESCRIPTION OF DRAWINGS

Referring now to the drawings, in which the same characters of reference are employed to indicate corresponding or similar parts throughout the several figures of the drawings:

FIG. 5 is a side view, partially in cross-section, and illustrating the device assembled for pressing the bearing back into the spindle;

FIG. 6 is a side view illustrating the device assembled for pressing the axle hub back into the bearing;

FIG. 7 illustrates the various parts of the the hub and bearing puller and press device;

FIG. 9 is a cross-sectional view of the bracket used as a brace when removing the hub from the bearing;

FIG. 10 is a top view of a cup used as a brace when pushing the bearing out from the spindle and as a press when forcing the bearing back into the spindle; and FIG. 11 is a side cross-sectional view of the cup in FIG. 10.

DESCRIPTION OF THE PREFERRED EMBODIMENT

Figure 3:
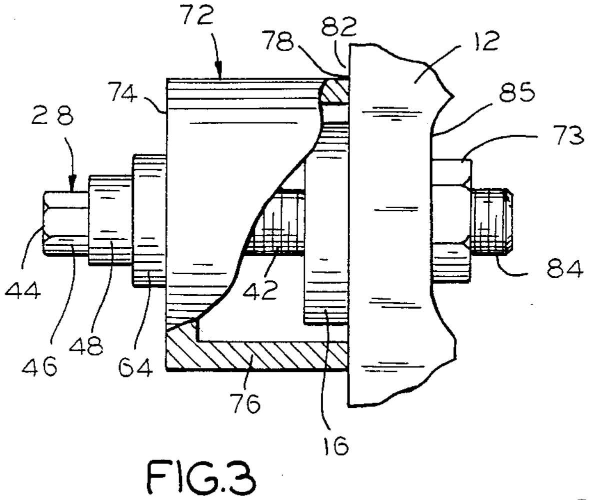
FIG. 3 is a side view illustrating the device assembled for pushing the bearing out from the spindle.
Figure 8:
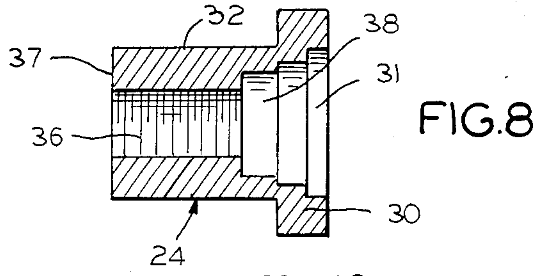
FIG. 8 is a cross-sectional view of the pulling means used for pulling the axle hub out from the bearing.
Figure 4:
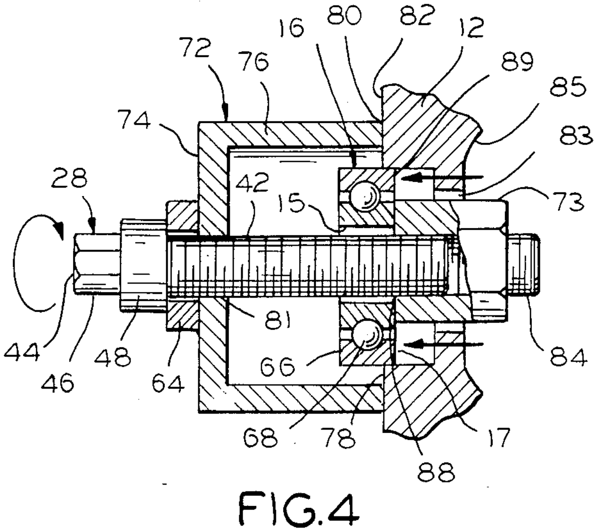
FIG. 4 is a cross-sectional side view similar to FIG. 3, and illustrating the bearing being pushed out from the spindle.

Referring now more particularly to FIG. 7 of the drawings, the reference numeral 10 indicates generally a hub and bearing puller and press device, embodying the principles of the invention, and specifically suitable for those automobiles having wheel drives requiring the hub to be initially removed before pulling the wheel bearings, such as, for examples, the Dodge OMNI and Dodge HORIZON. The automotive wheel drive includes a rotating spindle means 12 (partially shown in FIGS. 1 through 6) having an axial hub member 14 in a press fit association inside a bearing means 16, and the bearing means 16 is press fit inside a bore 17 formed in the spindle means 12. The wheel axle (not shown) extends inside the hub member 14 and is removable therefrom. The puller and press device 10 is used first to pull the hub member 14 out from the opening 15 in the bearing means 16 (FIGS. 1 and 2) and then to pull the bearing means 16 out from the bore 17 in the spindle means 12 (FIGS. 3 and 4). Thereafter, the device 10 is utilized and assembled for pressing a new or required bearing means 16 back into the bore 17, and then to press the hub member 14 back into the bearing means 16.

Hub Removal

Turning specifically to FIGS. 1, 2, 7 and 8, the use of the hub and bearing puller and press device 10 will be described for removing the hub member 14 from the bearing means 16. As may be seen from FIG. 6, the hub member 14 includes a disc 18 having four spaced apart threaded studs 20 extending outward therefrom. A hollow outer neck 22 protrudes centrally outward from the disc 18, and a hollow inner neck 23 also protrudes centrally outward but from the opposite side of the disc 18 for press fitting into the bearing 16.

A pulling means 24, a bracket or brace means 26 and a screw drive means 28 are utilized for pulling the hub 14 out from the bearing 16.

The pulling means 24(FIGS. 7 and 8) comprises a base plate 30 having a central opening 31 and a hollow housing 32 integrally formed to and extending outward from the base plate 30. Four spaced apart apertures 34 are formed in the base plate 30.

The housing 32 of pulling means 24 includes a tubular internally threaded central hole 36 extending inward from the top or outer end 37 and leading into an annular opening 38 which communicates with the opening 31. The opening 38 has a greater diameter than the hole 36 and is dimensioned to receive the outer neck 22 of the hub 14. As may be seen from FIG. 8, the opening 31 has a greater diameter than the opening 38. The housing 32 is positioned over the neck 22 and the studs 20 are received in the apertures 34 of the plate 30. The pulling means 24 is secured to the studs 20 of the hub 16 with at least two threaded nuts 40.

The screw drive means 28 includes an elongated screw portion 42 terminated at the drive end 44 with an hexagonal nut 46 attached to a circular collar 48. The screw portion 42 is threadedly received in the tubular hole 36 of the housing 32.

The bracket means 26 is a substatially "U" shaped configuration having a pair of spaced apart legs 50 welded or otherwise attached to opposite sides of a rectangular block 52. A foot 54 extends inward from each of the free ends 56 of the legs 50, spaced apart and opposed to each other. The feet 54 are operatively positioned between the disc 18 of the hub 14 and the spindle 12, as shown in FIG. 1.

An annular bore 56 is formed inward from the top or outer side 58 of the block 52 of the bracket 26 and communicates with an annular hole 60. A circular ledge 62 is recessed in bore 56 and extends around the hole 60

Figure 1:
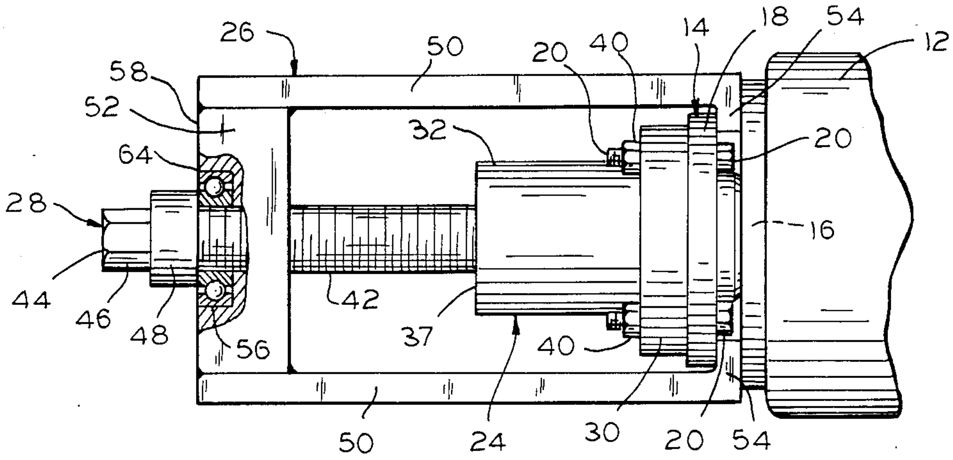
FIG. 1 is a side view illustrating the device assembled for pulling the axle hub out from the bearing in the spindle.
Figure 2:
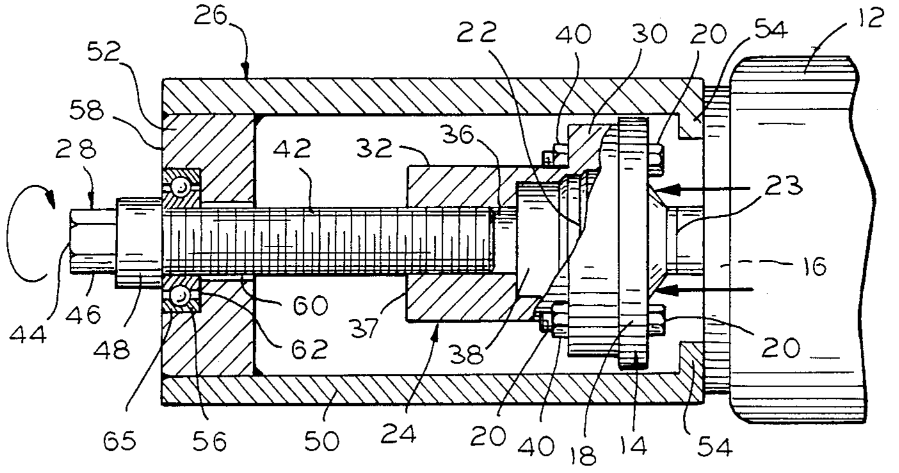
FIG. 2 is a cross-sectional side view similar to FIG. 1, but illustrating the hub pulled out from the wheel bearing.

A thrust washer 64 shown in FIGS. 1 and 7 is positioned on the ledge 62, or alternatively, a bearing member 65 shown in FIG. 2 is positioned on the ledge 62. The screw member 42 of the drive means 28 is passed through the washer 64 and the hole 60 for extending between the legs 50, until the collar 48 abuts the washer 64.

To remove the hub 14 from the spindle means 12, the pulling means 24 is positioned over the outer neck 22 of the hub 14 and received in opening 31 and the studs 20 are received in the apertures 34. At least two threaded nuts 40 are used to bolt the pulling means 24 to the hub 14. The bracket means 26 is placed over the bolted pulling means 24 so that the pulling means 24 is between the legs 50, and the feet 54 are braced between the disc 18 of the hub 14 and the spindle means 12. The hole 60(FIG. 9) in the block 52 should be in alignment with the threaded hole 36(FIG. 8) in the housing 32 of the pulling means 24. The thrust washer 64 is placed on the ledge 62 inside the bore 56 in the block 52. Now the screw member 42 is passed through the thrust washer 64 and hole 60 and threaded in the threaded hole 36 in the housing 32 until collar 48 of the screw drive 28 abuts washer 64. The spindle 12 should be substantially immovably secured, either with a vise or other suitable means.

A tool, such as a conventional impact wrench is used for gripping the hex nut 46 at the drive end 44 of the screw drive means 28, and the screw drive 28 is rotated in the direction for moving the screw portion 42 toward the spindle 12 until the collar 48 abuts the washer 64. In this position the screw portion 42 is rotatable (clockwise) but cannot move further inward into the threaded hole 36 of the housing 32 due to the contact of the collar 48 with the thrust washer 64 and the fixed position of the bracket means 26.

Therefore, as the screw member 42 is rotated, the housing 32 of the pulling means 24 begins to move outward along the rotating screw portion 42 toward the drive end 44 of the screw drive means 28 and pulls on the hub 14. This causes the hub to break away from its locked press fit association inside the bearing means 16 and move outward. The housing 32 moves further outward on the screw member 42 in response to the continued rotation ofthe screw member and causes further pulling of the hub away from the spindle and into the opening 31 of the housing 32. Finally, the hub is completely released from the bearing 16 of the spindle means 12, as may be seen in FIG. 2. The hub 14 is removed after screw 42 is screwed out from the threaded hole 36 in the housing and the nuts 40 are unfastened from the bolts 20. Now the bearing means 16 is ready to be pushed out from the spindle 12.

Bearing Removal

Referring now to FIGS. 3,4 and 7, the use of the hub and bearing puller and press device 10 will be described for removing the bearing means 16 from the spindle 12. The bearing means 16 is tightly press fitted inside the bore 17 of the spindle 12, and is accessible for removal only after the hub 14 had been pulled from the spindle. The bearing means 16 includes a bearing housing or cage 66, bearings 68 and the opening 15 previously containing the hub 14.

A plate 70(FIG. 6) generally covers the bearing 16 and held in place with three bolts 71. Prior to commencing the bearing pulling operation the bolts 71 are taken out and the cover plate 70 lifted away.

To force the bearing means 16 out from the spindle 12, a support cup 72 functioning as a brace means, the screw drive means 28 and a threaded drive nut 73 are primarily utilized.

The support cup 72 is hollow and defined by a flat base wall 74 closing one end of a cylindrical sidewall 76 and the opposite end 78 of the sidewall 76 being open and terminating with a circular edge 80. An opening 82 is formed through the base wall 74.

The drive nut 73 is dimensioned so that the outside width (or diameter) is than the diameter of the bearing opening 15, but less than the diameter of the spindle bore 17.

The support cup 72 is placed over the bearing means 16, so that the outer edge 78 contacts the front face 82 of spindle 12 to function as a brace. The thrust washer 64 is positioned on the screw drive means 28 in contact with collar 48. The screw portion 42 is passed through the opening 81 in the base wall 74, the opening 15 in the bearing means 16 and the opening 83 in spindle 12. The outer or free end 84 of the screw portion 42 extends out from the back side 85 of the spindle. The washer 64 abuts the outside 86 of the base wall 74.

The drive nut 73 is screwed on the outer end 84 of the screw portion 42. The forward face 88 of the nut 73 is brought into contact with the rear side 89 of the bearing means 16.

The wrench tool is again used for gripping the hex nut 46 at the drive end 44 of the screw drive means 28 for rotating the screw portion 42. Since the collar 48 and the washer 64 have a greater outside diameter than the diameter of the opening 80 in the wall 74 of the cup support 72, the screw 42 cannot move further as it is being rotated in the direction (clockwise) for moving inward toward spindle 12. Consequently, the clockwise rotation of the screw drive 28 causes the drive nut 73 to move along the screw portion 42 toward the screw drive end 44. The force from the drive nut 73 causes the bearing means 16 to break its engagement in the bore 17 of the spindle 12. The continued movement of the drive nut 73 inward on the screw portion 42 as the screw 42 rotates, causes further pushing of the bearing 16 out from the spindle, and finally the bearing passes from the spindle into the support cut 72.

Pressing Bearing in Spindle

When a new bearing or a reconditioned bearing 16 is ready to be inserted into the bore 17 of the spindle 12, the bearing 16 is initially hand pressed into the bore 17. Now referring specifically to FIG. 5, it will be seen that the support cup 42 is inverted from its pulling operative position so that the outside surface 89 of the base wall 74 contacts the front face 90 of the bearing means 16.

The washer 64 is positioned on the screw drive means 28 and in contact with the collar 48. The screw portion 42 passes through the opening 82 in the wall 74 from the inside of the cup 72, the opening 15 in the bearing means 16 and the bore 17 in the spindle, so that the outer end 84 extends out from the rear side 85 of the spindle. The washer 64 is sandwiched between the collar 48 and the inside of the base wall 74.

A washer 92 having an opening 94 is placed on the outer end 84 of the screw portion 42 to abut against the rear side 85 of the spindle. The outside diameter of the washer 92 is greater than the diameter of the opening 83 in the spindle 12. The nut 73 is also positioned on the outer end 84 of the screw memeber 42 to abut against the washer 92.

Since the nut 73 is locked in place on the screw portion 42, the rotation of the hexagonal nut 46 with the wrench tool causes the screw portion 42 to move longitudinally inward and the collar 48 and washer 64 to press against the wall 74 of the support cup 93, which in turn, presses the bearing means 16 into the bore 17. The continued rotation of the hex nut 46 further presses the bearing 16 into the spindle bore 17, until finally the bearing is fully pressed inside the bore 17.

Pressing Hub Inside Bearing

After the bearing 16 has been pressed into the bore 17 of the spindle, the hub 14 is pressed into the opening 15 of the bearing 16. Before the hub 14 is pressed in place, the plate 70 is positioned over the bearing means 16 and secured in place with the studs 71.

Now turning particularly to FIG. 6, it will be seen that the washer 64 is positioned on the screw drive means 28 in contact with the collar 48. The screw drive means 28 is passed throught the opening in the hub 14, the opening 15 in the bearing 16, so that the outer end 84 extends to the rear side 85 of the spindle 15. The washer 92 is positioned on the outer end 84 of the screw portion 42 and then the nut 73 is screwed onto the outer end 84 to abut the washer 92. The washer 92 blocks the nut 73 from moving further inward toward the spindle 15. The washer 64 is sandwiched between the outer neck 22 and the collar 48.

The rotation of the hex nut 46 with the wrench tool, causes the collar 48 and washer 64 to bear against the hub 14 as the screw portion 42 revolves for inward movement toward spindle 12. As the hub 14 is forced into the spindle, the nut 73 is maintained in tight contact with the washer 92. The continued rotation of the screw drive means 28 causes further movement of the hub 14 inward to the inside of opening 15 in the bearing 16, until finally the hub 14 is fully pressed into the opening 15.

The description of the preferred embodiment of this invention is intended merely as illustative of this invention, the scope and limits of which are set forth in the following claims.

I claim:

1. A device for removing a hub from a bearing means fitted inside a spindle of an automotive wheel device, said hub including a disc having an outer neck extending outward thereform and spaced apart studs also extending outward therefrom, said device comprising:
   - a screw drive having a head means and a screw portion;
   - a brace means for contacting a fixed surface, said brace means including an opening dimensioned to permit said screw portion to extend through and to prevent the head means of the screw drive from passing through, said screw drive being rotatable within said opening;
   - a housing having a threaded hole extending inward from the top thereof, for receiving said screw portion of the screw drive after said screw portion has passed through said opening of the brace means;
   - a base plate having a central hole and spaced apart apertures, said apertures being dimensioned to receive said studs of the hub, said base plate being secured to the bottom of the housing, the inside of the housing adjacent the bottom being hollow and in communication with the hole of the base plate for receiving the outer neck of the hub; and attaching means for securing said studs of the hub to the base plate when the studs extend through the apertures of the base plate, said screw drive being rotatable in one direction without moving in a longitudinal direction when the head means is adjacent said opening of the brace means, thereby causing said housing to move longitudinally along said screw portion toward said head means of the screw drive for pulling the hub out from the bearing means and moving said outer neck into the hollow of the housing via the hole of the base plate.

2. The device of claim 1, wherein said spindle is substantially immovably secured, and said brace means is a substantially "U" configuration and includes:

a block having said opening; and a pair of legs attached to opposite sides of said block, the outer ends of said legs operatively contacting said spindle.

3. The device of claim 2, wherein the outer end of each leg includes a foot spaced apart and opposed to the foot of the other leg for positioning between the hub and spindle, and contacting the spindle.

4. The device of claim 2, wherein said opening in said block includes a circular bore extending from the outer end of the block to an inner wall, a hole formed through said inner wall and communicating with the bore, said screw portion passing through said bore and hole in said block, said washer being positioned on said inner wall inside said bore, said head of the screw drive bearing on said washer.

* * * * *